Dec. 26, 1922.
E. M. SEAMAN,
FIXTURE STUD ADAPTER,
FILED JAN, 23, 1922,
1,439,713
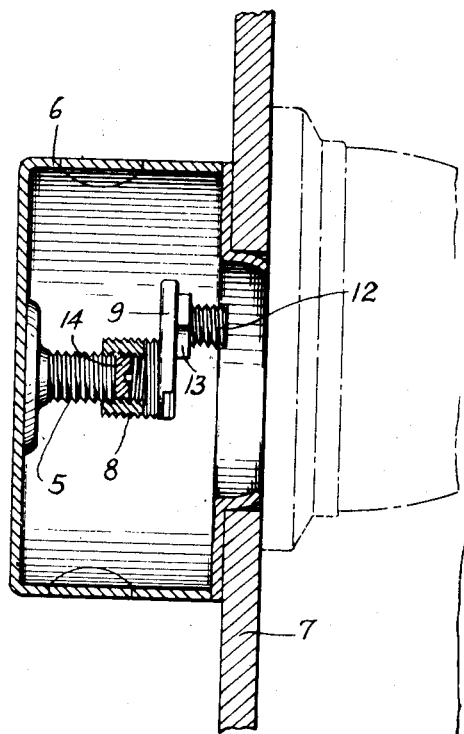
Fig. 1.
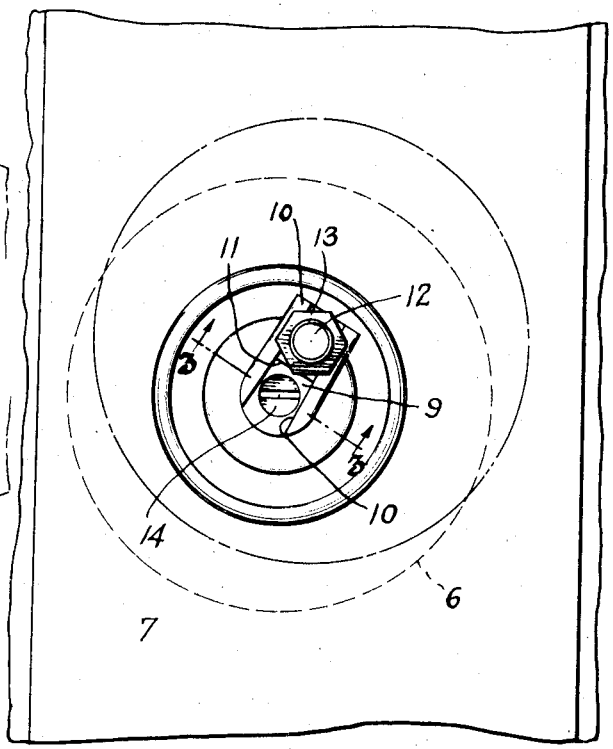
Fig. 2.
Fig. 3.
Edwin M. Seaman INVENTOR
BY
Philip S. McLean, ATTORNEY Patented Dec. 26, 1922.

1,439,713

UNITED STATES PATENT OFFICE.

EDWIN M. SEAMAN, OF MINEOLA, NEW YORK.

FIXTURE-STUD ADAPTER.

Application filed January 23, 1922. Serial No. 531,061.

*To all whom it may concern:*

Be it known that I, EDWIN M. SEAMAN, a citizen of the United States, and a resident of Mineola, Long Island, in the county of Nassau and State of New York, have invented certain new and useful Improvements in Fixture-Stud Adapters, of which the following is a specification.

My invention relates to the mounting and support of electrical fixtures.

According to present day constructions and practice the position of an electric fixture, a side wall or ceiling lighting fixture for instance, is determined by the location of the fixture stud which is to support it and which stud is secured in fixed position on the bottom or back wall of an outlet box. It is not always possible, because of structural limitations, to locate these outlet boxes so as to bring the fixture supporting stud into position to support the fixture in just the desired position.

It is the purpose of my invention to overcome these limitations and to make it possible to locate the fixture independently of the particular position of the outlet box and fixture stud.

These objects and certain other advantages are attained in my invention by means of what I have termed a fixture stud adapter of novel construction, which is adapted for engagement with the fixture stud in various angularly adjusted relations and which carries eccentrically adjustable means for supporting the fixture.

An example of one of the practical commercial forms of the invention is disclosed in the accompanying drawing forming part of this specification.

In Figure 1 of this drawing I have shown the adapter, partly in section, secured in adjusted relation on a fixture stud and arranged for supporting a fixture centered upon a wall panel, the canopy of the fixture being indicated in broken lines and the wall panel and outlet box being shown in section.

Figure 2 is a view looking at the front of the panel, with the outlet box indicated in dash lines at the back thereof and the fixture canopy shown in dot and dash lines as centered on the front of the panel.

Figure 3 is a cross sectional view of the adapter as taken on substantially the plane of line 3—3 of Figure 2.

In the example shown, the adapter is applied to a fixture stud 5 secured in the usual way to the back of an outlet box 6 which is suitably supported in a wall at the back of a wall panel 7. This illustration assumes that it has been necessary for some structural reasons to support the outlet box off to one side of the center line of the panel, or conversely, that the panel, door trim or the like has been put up in a position offset to one side of the axis of the stud. This condition is clearly illustrated in Figure 2 where it will be seen that the outlet box and panel are "off-center".

The adapter answers the purpose of providing a connection with the stud which will support the light fixture or other device centrally located with respect to the panel.

This adapter consists, in the embodiment illustrated, of a sleeve 8 shown as both internally and externally screw-threaded to engage either with the threaded post or in the threaded socket of a fixture stud and carrying at its outer end a laterally projecting arm 9 having parallel overturned edge portions 10 forming an undercut channel within which there is slidingly confined the angular base 11 of a projecting screw-threaded fixture supporting post 12. This post is constructed as to size, shape, etc., to receive the bracket portion of a lighting or other fixture which it is desired to support and is secured in variously adjusted relations on the arm by a lock nut 13 which can be screwed down on the post into binding engagement with the overturned confining edge flanges.

The fixture supporting post is in this way made eccentrically adjustable on the adapter sleeve and after adjustment toward or away from the center may be readily secured in such position.

The sleeve itself is, on the other hand, angularly adjustable about the axis of the stud with which it is engaged. This with the eccentric adjustment, it will be seen, makes it possible to raise and lower the fixture support and to shift the same laterally in both directions. This gives a wide range of adjustments, enabling the fixture to be brought into practically any desired relation, such as to be centered with respect to a wall panel or to be shifted up or down or to one side or the other to avoid a beam or other object which may stand in the way.

The in and out adjustment of the adapter on the fixture stud is also important in bringing about a proper relation of the parts and in this connection I find it particularly useful to provide a locking device for securing the adapter at any required angular adjustment and at any desired point longitudinally on the stud. This locking device I have herein shown in the form of a lock screw 14 engaged within the threaded interior of the sleeve and adapted to be turned by a screw-driver or other tool inserted through the open outer end of the sleeve, down into binding engagement with the end of the fixture stud, as in Figure 1.

In addition to advantages noted and others more or less obvious, it will be appreciated that the device is both simple and inexpensive, can be easily applied and adjusted and is entirely practical.

What I claim is:

1. In electrical apparatus, a fixture stud adapter having means accessible at the front of the same for securing the same in various angularly adjusted relations on a fixture stud and provided with a rigid laterally outstanding arm and fixture supporting means longitudinally adjustable on said arm.

2. In electrical apparatus, a fixture stud adapter constructed for engagement with a fixture stud in various angularly adjusted relations and provided with a rigid laterally outstanding arm and a projecting fixture supporting post adjustable longitudinally to different positions on said arm.

3. A fixture stud adapter comprising an internally threaded sleeve for engagement on a threaded fixture stud open at the outer end and carrying a laterally extending arm, a lock screw within said threaded sleeve and accessible through the open outer end thereof and a fixture support with means for securing the same in variously adjusted relations on the laterally extending arm.

4. The structure of claim 3 in which the fixture support has a base slidingly engaged within a channel on the arm and is held by a lock nut which can be turned into binding engagement with the arm.

5. A fixture stud adapter comprising an internally threaded sleeve for engagement with a threaded fixture stud and open at the outer end, an eccentrically adjustable fixture support carried by said outer end of the sleeve and a lock screw within the sleeve and accessible through the open outer end thereof.

6. A fixture stud adapter comprising an internally threaded sleeve open at its outer end and carrying a laterally extending arm having confining flanges at the edges thereof, a threaded fixture supporting post having an angular base slidingly held beneath said flanges, a lock nut on said post for securing the same in variously adjusted relations and a lock screw within the sleeve and accessible through the open outer end of the same.

7. A fixture adapter engageable upon and rotatably adjustable about a fixture stud, means accessible at the front of the adapter for securing the same fixed in various angularly adjusted positions on the fixture stud, a fixture support adjustable on the adapter toward and away from the center of the same and means for securing said fixture support fixed in various eccentric positions on the adapter.

8. A fixture adapter comprising a sleeve internally screw threaded for engagement over a screw threaded fixture stud and externally screw threaded for engagement in a screw threaded socket or the like, means for securing said sleeve fixed in various angularly adjusted positions on its support, a fixture support eccentrically adjustable on said sleeve and means for securing said fixture support fixed in various eccentric positions upon the sleeve.

In witness whereof, I have hereunto set my hand this 17th day of January, 1922.

EDWIN M. SEAMAN.